(12) United States Patent
Hirschfeld et al.

(10) Patent No.: US 7,950,690 B2
(45) Date of Patent: May 31, 2011

(54) STEERING WHEEL FOR A MOTOR VEHICLE

(75) Inventors: Klaus Hirschfeld, Lüdenscheid (DE);
Martin Deitmerg, Lüdenscheid (DE);
Ralf Böbel, Holzwickede (DE); Klaus Nieding, Halver (DE); Frank Bläsing, Werl (DE); Holger Lettmann, Plettenberg (DE); Rüdiger Menz, Iserlohn (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 2093 days.

(21) Appl. No.: 10/654,239

(22) Filed: Sep. 3, 2003

(65) Prior Publication Data
US 2005/0204857 A1    Sep. 22, 2005

Related U.S. Application Data

(63) Continuation of application No. PCT/EP02/03165, filed on Mar. 21, 2002.

(30) Foreign Application Priority Data

Mar. 23, 2001   (DE) .................................. 101 14 687

(51) Int. Cl.
B60R 21/203   (2006.01)
B62D 1/00    (2006.01)
G01L 3/14    (2006.01)

(52) U.S. Cl. .................. 280/731; 280/771; 200/61.54; 74/552; 180/422; 439/34; 439/25

(58) Field of Classification Search .................. 280/771, 280/731; 200/61.54; 74/552; 180/422; 439/34, 439/15
See application file for complete search history.

(56) References Cited

U.S. PATENT DOCUMENTS

| | | | |
|---|---|---|---|
| 6,183,005 B1 * | 2/2001 | Nishijima et al. | 280/731 |
| 6,269,702 B1 * | 8/2001 | Lambson | 73/862.045 |
| 6,402,196 B1 * | 6/2002 | Nicot | 280/771 |
| 6,427,542 B1 | 8/2002 | Nicot | |
| 6,517,113 B1 * | 2/2003 | Nicot | 280/771 |
| 6,694,282 B2 * | 2/2004 | Perner | 702/130 |
| 6,799,481 B2 * | 10/2004 | Nieding et al. | 73/862.338 |

FOREIGN PATENT DOCUMENTS

| | | |
|---|---|---|
| DE | 101 14 688 C1 | 3/2001 |
| FR | 2 774 470 A | 2/1998 |
| JP | 62 105770 A | 5/1987 |

* cited by examiner

Primary Examiner — Ruth Ilan
(74) Attorney, Agent, or Firm — Brooks Kushman P.C.

(57) ABSTRACT

A steering wheel (13) for a motor vehicle includes a steering wheel module (1) supporting electrical/electronic subassemblies (18). The steering wheel module is inserted from a front side of the steering wheel into a center of the steering wheel in order to be attached to the steering wheel. A lower end of the steering wheel module forms a torsion module (8) of a torque detection device for a steering power-assist system. The torsion module is operable to receive and be attached to a steering spindle (14) of a steering column on the back side of the steering wheel in order to attach the steering wheel to the steering spindle when the steering wheel module is attached to the steering wheel.

14 Claims, 2 Drawing Sheets

STEERING WHEEL FOR A MOTOR VEHICLE

CROSS-REFERENCE TO RELATED APPLICATIONS

This is a continuation of International Application PCT/EP02/03165, published in German, with an international filing date of Mar. 21, 2002.

BACKGROUND OF THE INVENTION

1. Field of the Invention

The present invention relates to a steering wheel for a motor vehicle having a steering wheel module which supports electrical/electronic subassemblies and is attached to the steering wheel.

2. Background Art

Among other things, motor vehicle steering wheels include electrical/electronic subassemblies such as switches, display instruments, an airbag device, etc. In general, these subassemblies are assembled individually and independently of one another in or on the steering wheel or spokes of the steering wheel. To simplify assembly of these subassemblies, especially the control element, it has been suggested to arrange the subassemblies jointly on a base support so that they can be jointly attached to the steering wheel. Such a previously known steering wheel module will, as a rule, be attached to the pressure side of the steering wheel.

Electrical steering power-assist systems are being used in an increasing extent in motor vehicles. For these steering power-assist systems, the torque exerted on the steering wheel is necessary as a reference value so that using the detected torque the desired steering power-assist can take place. A torsion module is used to detect or measure the torque. A torsion module allows an angular offset between the steering wheel and the steering spindle when a torque is applied to the steering wheel in order to measure the torque.

Such teachings are, for example, known from DE 197 55 044 C1 and WO 99/40402 A1. In the case of the items disclosed in these documents, the torsion module is assembled between the steering wheel and the steering spindle separate from the steering wheel and also separate from the electrical/electronic subassemblies attached to the steering wheel. Accordingly, the torsion module including the mechanisms for detecting the rotational offset must be assembled separately and electrically connected. For this reason, a comprehensive functionality test of the steering wheel, including the torque detection device, cannot be performed until the necessary subassemblies have been assembled in the motor vehicle. In general, this is possible, but it means that the functionality test has to be performed by the vehicle manufacturer.

SUMMARY OF THE INVENTION

Based on the prior art discussed above in the Background Art, the purpose of the present invention is to enhance a steering wheel as described above with a steering wheel module that enables a comprehensive functionality test of the electrical/electronic subassemblies mounted in the steering wheel, including the torque detection device for a steering power-assist system, to be performed prior to assembly of the steering wheel on the steering spindle of a steering column so that the functionality test of the subassemblies and the torque detection device is no longer necessary after assembly of the steering wheel in the motor vehicle has been completed.

This object is achieved, according to the present invention, in that part of the steering wheel module is the torsion module of a torque detection device of a steering power-assist system or steering system. The steering wheel module along with its torsion module can be inserted from the front into the center of the steering wheel. The steering wheel module is attached to the steering wheel through the torsion module. The steering wheel itself can thus be joined to the steering spindle of a steering column via the torsion module.

In contrast to the known prior art, in the case of the steering wheel according to the present invention, part of the steering wheel module is the torsion module of a torque detection device. The steering wheel module is attached to the steering wheel via the torsion module so that in this way the steering wheel itself is able to be joined to the steering spindle of a steering column via the torsion module. Furthermore, the steering wheel module can be inserted from the front into the center of the steering wheel so that the steering wheel module can be assembled as a whole, including its torsion module, on the steering wheel in one step.

Prior to its assembly on the steering wheel, the steering wheel module is suitably tested with regard to the functionality of its components so that such a functionality test is basically no longer necessary at a later time. Assembly of the steering wheel module, already tested for functionality, to the steering wheel can be performed by both a steering wheel manufacturer as well as a motor vehicle manufacturer without affecting the previous functionality test because the electrical/electronic subassemblies already combined in the steering wheel module, including the torsion module, no longer have to be disassembled again. After attaching the steering wheel module along with its torsion module to the steering wheel, the torsion module and therefore the steering wheel with steering wheel module can be subsequently attached to the steering spindle.

In a preferred embodiment, the torsion module is shaped like a type of spoke wheel whose hub piece can be joined so that it does not rotate with respect to the steering spindle. Stretching out radially from the hub piece are a plurality of flexible spokes that join the hub piece to a rim that concentrically surrounds the hub piece. The flexible spokes are suitably equipped with strain gauges via which it is possible to detect the amount of flexing which is dependent on the applied torque.

In order to limit the possible amount of flexing of the flexible spokes due to an offset resulting from an applied torque between the hub piece and the rim, it is useful to arrange limit stop spokes alternately with the flexible spokes such that these limit stop spokes are attached so that they do not rotate with respect to the hub pieces and engage a limit stop arrangement on the rim with each of their free ends. The limit stop arrangement can be constructed, for example, of two beads distanced from one another.

The amount of flexing of the flexible spokes can be detected using so-called strain gauges that are affixed on the outside of the flexible spokes. In one such case it is useful to have limit stop spokes engage a limit stop arrangement which also limits relative movement of the rim with respect to the hub piece in an axial direction. The purpose of the limit stops that operate in an axial direction is to prevent axial bending of the flexible spokes in order to counteract faulty interpretations caused by the axial bending.

Part of the steering wheel module can also be an airbag device which with regard to its pre-tested functionality can be likewise assembled on the steering wheel or in the motor vehicle. In case such an airbag device is part of the pre-tested steering wheel module, it is useful to attach the torsion module with the mounted steering wheel module and the steering wheel to the steering spindle using a radial-acting means of fastening. Alternatively, axial fastening to the steering spindle can also be provided.

DETAILED DESCRIPTION OF THE PREFERRED EMBODIMENT(S)

Figure 1:
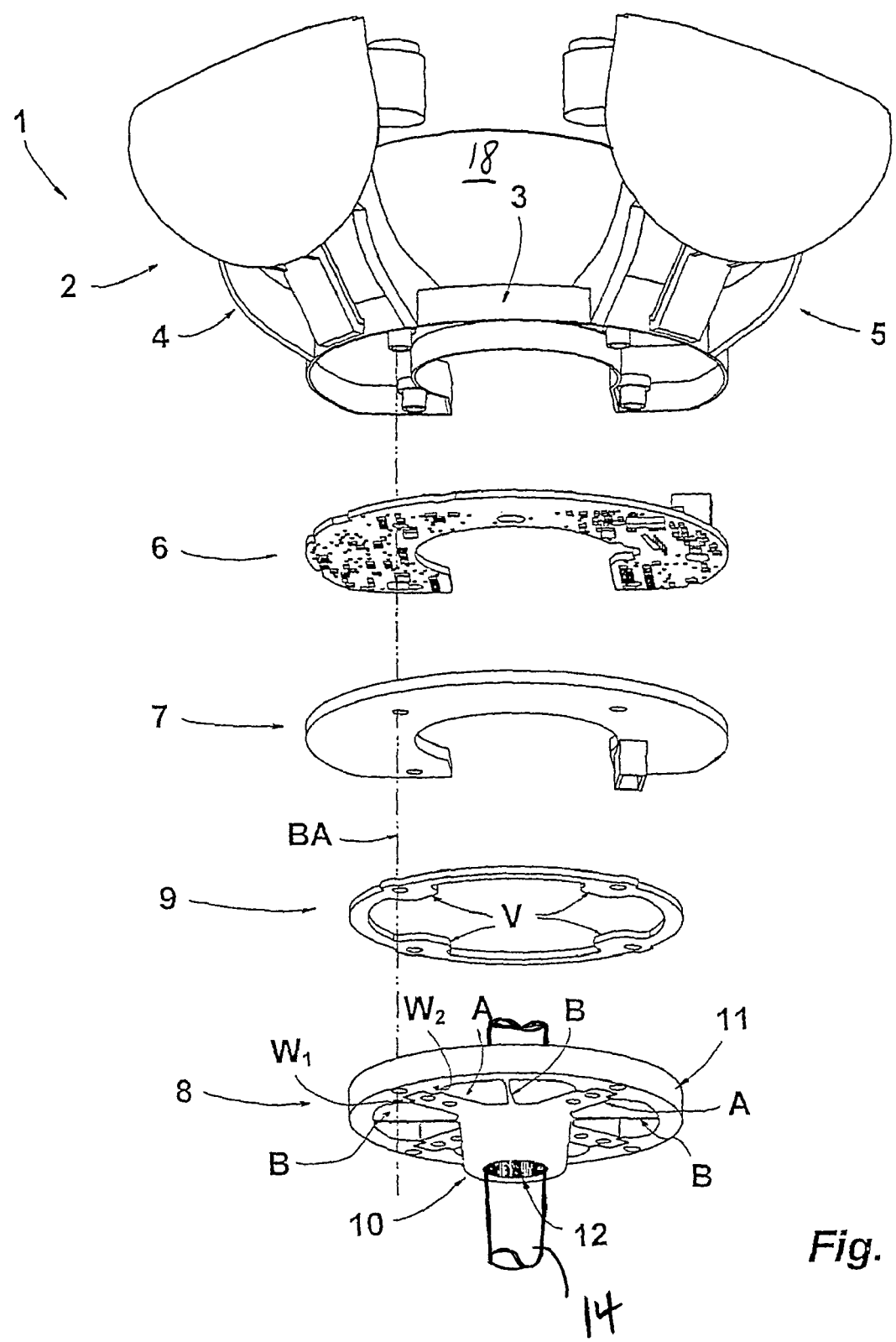
FIG. 1 illustrates a steering wheel module for the steering wheel of a motor vehicle in the nature of an exploded view.

Steering wheel module 1 for outfitting a motor vehicle includes a base support 2 having a casing 3 and upward projecting brackets 4, 5. Holders for the electrical switches or switch configurations located on top are arranged on casing 3 and upward projecting brackets 4, 5. Brackets 4, 5 are set up so that the electrical/electronic subassemblies 18 to be operated and supported by them are arranged next to the airbag cover of a steering wheel. Inserted in casing 3 is a circuit board 6 having the power electronics necessary for operating the electrical/electronic subassemblies of brackets 4, 5. Casing 3 is connected underneath by a bottom cover 7.

The lower end of steering wheel module 1 forms a torsion module 8 for a torque detection device. Torsion module 8 is in the form of a spoke wheel. Spoke wheel 8 is separated from bottom cover 7 by a spacer ring 9. Spoke wheel 8 includes four flexible spokes which join a hub piece 10 of the spoke wheel with a rim 11 that concentrically surrounds the hub piece. Hub piece 10 has a multi-grooved mounting channel 12 which serves as the holder for the free end of a steering spindle 14 of a steering column.

Via hub piece 10, spoke wheel 8 is joined to steering spindle 14 so that it cannot rotate with respect to the steering spindle. Alternating with flexible spokes B, additional limit stop spokes A, each of whose free ends engage a limit stop arrangement made up of two respective beads $W_1$, $W_2$, extend in a radial direction from hub piece 10. Limit stop spokes A serve to limit the maximum angular offset between rim 11 and hub piece 10. Though not shown in FIG. 1, each of the respective flexible spokes B are equipped with strain gauges that detect the amount of flexing and thus a relative angle of rotation offset between rim 11 and hub piece 10. The strain gauges are connected to an analysis device that is also part of steering wheel module 1.

In the area of its regions adjacent to the limit stop arrangements formed by the beads $W_1$, $W_2$, spacer ring 9 has inwardly pointing projections V that are each adjacent to the upper side of the beads $W_1$, $W_2$, and cover the limit stop gap formed by the beads $W_1$, $W_2$. The free end of the limit stop spokes A is also correspondingly guided on the bottom, either by another disk corresponding to spacer ring 9 or another component, for example, the base plate of a steering wheel. Due to the free ends of the limit stop spokes A being guided, a relative movement between hub piece 10 and rim 11 in the axial direction is hindered, so that when exerting such forces on spoke wheel 8 flexible spokes B are not bent. This serves to prevent faulty interpretations by the strain gauges affixed to one of the flexible spokes B which could result from a bending of a flexible spoke in an axial direction.

All components of steering wheel module 1—base support 2, circuit board 6, bottom cover 7, spacer ring 9, and spoke wheel 8 have four holes aligned with one another so that these components can be joined together by the attachment bolts. One of these four attachment axes is identified in FIG. 1 with the reference "BA". In the embodiment illustrated in FIG. 1, the attachment bolts pass through the individual components of steering wheel module 1 and are fastened to the center of a steering wheel with its threads. Thus, spoke wheel 8 attached to steering wheel module 1 serves to couple the steering wheel to steering spindle 14.

Figure 2:
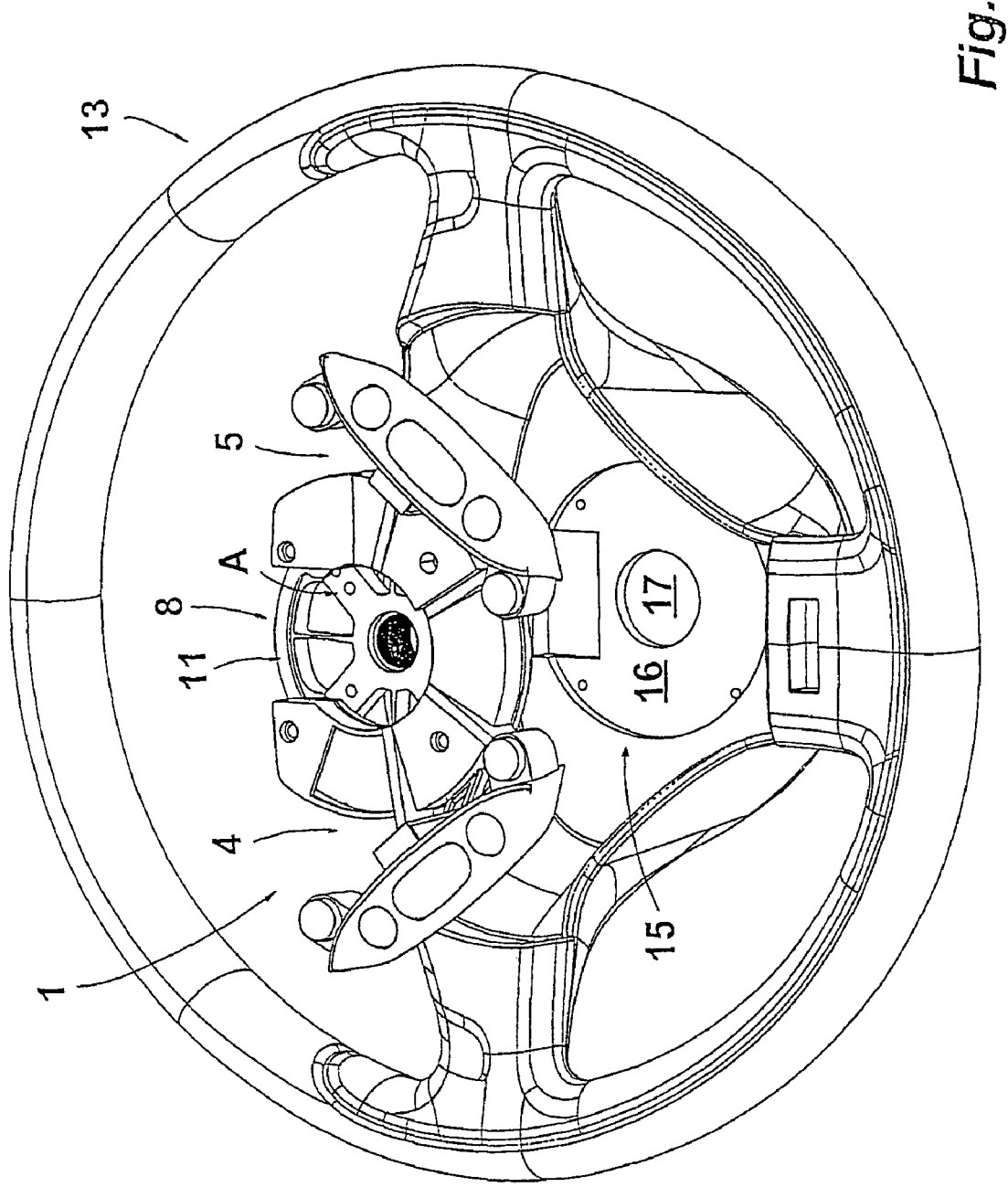
FIG. 2 illustrates a top side view of the steering wheel module inserted in the steering wheel shown in FIG. 1 in the nature of an exploded view.

Assembled steering wheel module 1 shown in FIG. 2 is axially arranged and aligned to a steering wheel 13 in which it is fastened in a center 15 of the steering wheel. Steering wheel module 1 also holds the airbag unit (not shown), which is attached in an assembled condition between the two brackets 4, 5 with the electric switches. The airbag unit is held between the individual switches of brackets 4, 5.

A pushbutton switch is placed on each of the respective outer ends of brackets 4, 5 on which the bottom side of the airbag unit rests. These pushbutton switches serve as the hub piece contacts because the horn is also included along with the airbag unit. Attaching the hub piece contacts to brackets 4, 5 is useful because this can then be directly connected electrically to the power electronics on circuit board 6.

Center 15 of steering wheel 13 is formed by a circular recess 16 having a central perforation 17. Hub piece 10 of steering wheel module 1 penetrates central perforation 17. Furthermore, the threaded holes for inserting the attachment bolts for assembling steering wheel module 1 to steering wheel 13 are identifiable. The top side of circular recess 16 lies on the bottom side of rim 11 of spoke wheel 8 so that the lower limit stop for the limit stop spokes A of the spoke wheel is represented by this area.

REFERENCE CHARACTER LIST

1 Steering wheel module
2 Base support
3 Casing
4 Bracket
5 Bracket
6 Circuit board
7 Bottom cover
8 Spoke wheel
9 Spacer ring
10 Hub piece
11 Rim
12 Mounting channel
13 Steering wheel
14 Steering spindle
15 Center
16 Recess
17 Perforation
18 Electrical/Electronic subassembly
A Limit stop spoke
B Flexible spoke
BA Attachment axis
V Projection
W1, W2 Bead While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A steering wheel for a motor vehicle, the steering wheel having a front side with a center and a back side, the steering wheel comprising:
   a steering wheel module supporting electrical/electronic subassemblies, the steering wheel module being inserted from the front side into the center of the steering wheel to be attached to the steering wheel;
   wherein a lower end of the steering wheel module forms a torsion module of a torque detection device for a steering power-assist system, the torsion module being operable to receive and be attached to a steering spindle of a steering column on the back side of the steering wheel in order to attach the steering wheel to the steering spindle when the steering wheel module is attached to the steering wheel;
   wherein the torsion module is a spoke wheel having a hub piece that is operable to receive and be attached to the steering spindle, the spoke wheel further having a rim that concentrically surrounds the hub piece through a plurality of flexible spokes;
   wherein the spoke wheel includes limit stop spokes arranged alternately with the flexible spokes, the limit stop spokes being joined to the hub piece and the rim such that the limit stop spokes are prevented from being rotated with respect to the hub piece and such that ends of the limit stop spokes engage limit stop arrangements located on the rim.

2. The steering wheel of claim 1 wherein:
   the rim includes attachment holes which run parallel to an axial axis of the hub piece, the attachment holes for receiving bolts attached to the steering wheel module in order to attach the steering wheel module to the spoke wheel.

3. The steering wheel of claim 1 wherein:
   each limit stop arrangement is formed by two stop beads in the rim, each bead pointing radially inwards toward the hub piece.

4. The steering wheel of claim 1 wherein:
   the flexible spokes of the spoke wheel include strain gauges for the detection of torque applied on the steering wheel.

5. The steering wheel of claim 1 wherein:
   the limit stop spokes of the spoke wheel are limited by stops along the axial direction of the hub piece in order to hinder relative movement between the hub piece and the rim in the axial direction.

6. The steering wheel of claim 1 wherein:
   the electrical/electronic subassemblies of the steering wheel module include an analysis device for evaluating the torque exerted on the steering wheel as detected by the torsion module.

7. The steering wheel of claim 1 wherein:
   the electrical/electronic subassemblies of the steering wheel module include an airbag unit.

8. A steering assembly for a motor vehicle, the steering assembly comprising:
   a steering wheel having a front side with a center and a back side;
   a steering spindle of a steering column; and
   a steering wheel module supporting electrical/electronic subassemblies, the steering wheel module being inserted from the front side into the center of the steering wheel to be attached to the steering wheel;
   wherein a lower end of the steering wheel module forms a torsion module of a torque detection device for a steering power-assist system, the torsion module being operable to receive and be attached to the steering spindle on the back side of the steering wheel in order to attach the steering wheel to the steering spindle when the steering wheel module is attached to the steering wheel;
   wherein the torsion module is a spoke wheel having a hub piece operable to receive and be attached to the steering spindle, the spoke wheel further having a rim that concentrically surrounds the hub piece through a plurality of flexible spokes;
   wherein the spoke wheel includes limit stop spokes arranged alternately with the flexible spokes, the limit stop spokes being joined to the hub piece and the rim such that the limit stop spokes are prevented from being rotated with respect to the hub piece and such that ends of the limit stop spokes engage limit stop arrangements located on the rim.

9. The steering assembly of claim 8 wherein:
   the rim includes attachment holes which run parallel to an axial axis of the hub piece, the attachment holes for receiving bolts attached to the steering wheel module in order to attach the steering wheel module to the spoke wheel.

10. The steering assembly of claim 8 wherein:
    each limit stop arrangement is formed by two stop beads in the rim, each bead pointing radially inwards toward the hub piece.

11. The steering assembly of claim 8 wherein:
    the flexible spokes of the spoke wheel include strain gauges for the detection of torque applied on the steering wheel.

12. The steering assembly of claim 8 wherein:
    the limit stop spokes of the spoke wheel are limited by stops along the axial direction of the hub piece in order to hinder relative movement between the hub piece and the rim in the axial direction.

13. The steering assembly of claim 8 wherein:
    the electrical/electronic subassemblies of the steering wheel module include an analysis device for evaluating the torque exerted on the steering wheel as detected by the torsion module.

14. The steering assembly of claim 8 wherein:
    the electrical/electronic subassemblies of the steering wheel module include an airbag unit.

\* \* \* \* \*